United States Patent
Butler et al.

(10) Patent No.: US 8,326,717 B2
(45) Date of Patent: Dec. 4, 2012

(54) RATE EXCEPTION MANAGEMENT TOOL

(75) Inventors: Brian Patrick Butler, Charlotte, NC (US); Kimberly Robin Nelson, Mooresville, NC (US); Cecelia Mason Oakley Gray, Lewisville, NC (US)

(73) Assignee: Wells Fargo Bank N.A., Charlotte, NC (US)

( * ) Notice: Subject to any disclaimer, the term of this patent is extended or adjusted under 35 U.S.C. 154(b) by 535 days.

(21) Appl. No.: 12/235,267

(22) Filed: Sep. 22, 2008

(65) Prior Publication Data
US 2010/0076882 A1 Mar. 25, 2010

(51) Int. Cl.
*G06Q 40/00* (2006.01)
(52) U.S. Cl. .......................................................... 705/35
(58) Field of Classification Search ...................... 705/35
See application file for complete search history.

(56) References Cited

U.S. PATENT DOCUMENTS

| | | | | |
|---|---|---|---|---|
| 5,930,764 | A * | 7/1999 | Melchione et al. | 705/7.29 |
| 6,049,782 | A | 4/2000 | Gottesman | |
| 7,386,511 | B2 * | 6/2008 | Buchanan et al. | 705/45 |
| 8,271,364 | B2 * | 9/2012 | Nobili et al. | 705/35 |
| 2002/0077966 | A1 | 6/2002 | Harycki | |
| 2003/0225692 | A1 * | 12/2003 | Bosch et al. | 705/42 |
| 2005/0131809 | A1 * | 6/2005 | Watt et al. | 705/39 |
| 2008/0197189 | A1 * | 8/2008 | Srivastava et al. | 235/380 |

FOREIGN PATENT DOCUMENTS
WO WO0204882 A2 6/2002
* cited by examiner

*Primary Examiner* — Mary Cheung
*Assistant Examiner* — Daniel L Greene
(74) *Attorney, Agent, or Firm* — Kegler Brown Hill & Ritter; James J. Pingor

(57) ABSTRACT

The innovation relates to a system and/or methodology for the convenient and consistent determination of rate exceptions for banking products. The system provides for a rate exception component that determines one or more proposed exception rates based on a customer's score, and information regarding the competitive banking environment for similar banking products. The customer scores and competitive banking environment data are determined by a data analytics component, which can update the data at regular intervals or when modifications to the data occur.

21 Claims, 10 Drawing Sheets

RATE EXCEPTION MANAGEMENT TOOL

TECHNICAL FIELD

The subject specification relates generally to banking and financial institutions, and more particularly to a system and methodology for the consistent and convenient determination of rate exceptions.

BACKGROUND

Generally, in the financial industry, a 'rate exception' refers to a rate (e.g. interest rate, etc.) that is different from a board or standard rate normally offered by a financial institution. Financial institutions often offer customers rate exceptions for savings, investment, or credit accounts based on their relationship with the financial institution and/or a desire to attract new customers. In many instances, customer service representatives or financial institution employees often have the authority to make such a determination in real time by examining the customer's past dealings with the financial institution, and the current market for similar products. Alternatively, a financial institution may refer a rate exception request to a specialized department or group. However, this often leads to inconsistent proposals, or unnecessary delay in proposing a rate exception.

The ability to make quick, consistent, and convenient decisions is of high monetary significance for financial institutions. In addition, the ability to provide consistent decisions to customers can increase customer confidence, and eliminate rate shopping within the same financial institution. This has been difficult in the past, because the value of financial products is largely dependent on the location of the customer and/or the financial institution.

The value of financial products can vary significantly from one location to the next. In addition, each customer service representative or financial institution employee may evaluate the customer's relationship with the financial institution and the relevant market differently. Unfortunately, conventional techniques of handling rate exceptions do not account for the competitive market, and are prone to human error and subjectivity.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

The claimed subject matter relates to a system and/or method for convenient and consistent determinations of rate exceptions. In accordance with various aspects of the claimed subject matter, a data analytics component determines a customer score and/or a set of branch data. The customer score is most often based on the customer's relationship with a financial institution. The branch data is often based on the competitive environment and characteristics related to similar products, such as the location of the financial institution.

In aspects, a rate exception component determines a proposed rate exception based on the customer score and/or the branch data. In addition, for new customers the rate exception component can include additional criteria, such as the customer's credit score or an initial deposit, in its determination of the proposed rate. Customers have the option of accepting, declining, or holding the proposed rate exception based on their customer status.

Moreover, the rate exception component can update the customer score, the branch data, and/or a customer's account information based on their disposition regarding the proposed rate exception. In addition, the data analytics component can update customer scores and branch data at a predetermined interval or as the data changes.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
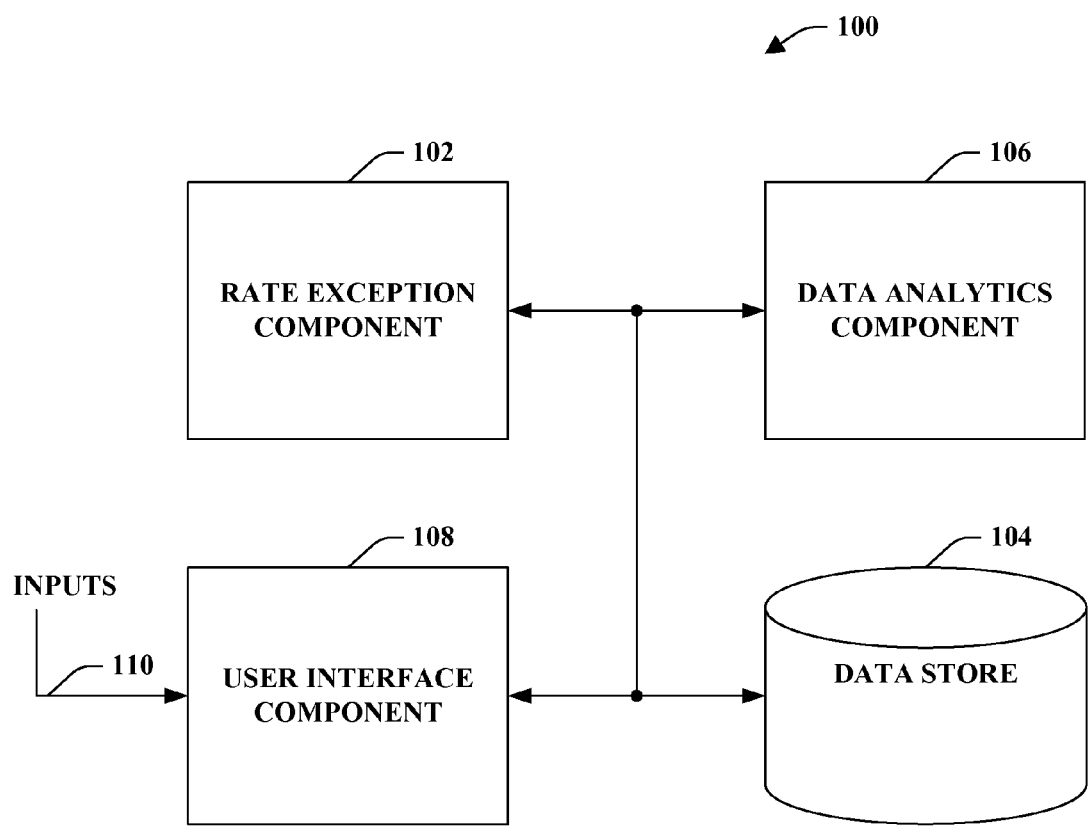
FIG. 1 illustrates a general component block diagram for a rate exception management system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components. As used in this application, the terms "product" and "service" are to have reciprocal descriptions. For example, if a product is described as having certain attributes such as a price, then it is to be appreciated that a service can inherently have the same and/or similar capabilities unless stated otherwise.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term 'article of manufacture' as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Referring initially to FIG. 1, an example block diagram of a rate exception system 100 is shown in accordance with an aspect of the subject innovation. The system 100 includes a rate exception component 102, an interface component 104, a data analytics component 106, and a data store 108.

The rate exception component 102 determines one or more proposed rate exceptions for a financial product (e.g. deposit account, credit account, investment account, etc.), wherein a rate exception is an interest rate other than a board rate (e.g. standard rate) offered by the financial institution. The rate exception component 102 can determine the rate exceptions based on customer data, such as a customer's relationship with a financial institution, a customer's credit rating, and/or the financial institution's business objectives, such as retaining or attracting the customer's business. In addition, the rate exception component 102 can determine the rate exception based on market data, such as similar products in a competitive environment.

For instance, an existing customer of a financial institution may desire an interest rate on a money market account above the financial institution's board rate. In this case, the rate exception component 102 can determine whether the customer qualifies for a rate exception based on their relationship with the financial institution (e.g. customer data), and the interest rates being offered for similar money market accounts in the competitive environment (e.g. market data). If the customer does not qualify for a rate exception, or if it would not be advantageous for the financial institution to offer a rate exception, then the rate exception component 102 can return a null value or the board rate. Alternatively, if the customer qualifies for a rate exception, then the rate exception component 102 can propose one or more alternative interest rates (e.g. rate exception) based on the customer's relationship with the financial institution, and/or interest rates being offered for similar money market accounts in the competitive environment.

The rate exception component 102 can obtain the customer data and/or market data from a data store 104. The data store 104 can contain customer data, including but not limited to customer account numbers, account types, customer contact information (e.g. names, addresses, phone numbers, etc.), and/or customer scores. In addition, the data store 104 can contain market data, including but not limited to data related to terms for financial products in the competitive environment, and the business objectives of the financial institution. Additionally or alternatively, the customer data can be obtained via user inputs (discussed infra).

The data analytics component 106 can analyze the customer data, and generate customers scores based on the customer data. The customer score is a confidence factor assigned to a customer based on their specific customer data, such as prior rate exception offers, account types, length of patronage, and so forth. The customer score can be represented as a percentage, a number on a predefined scale, a letter grade, etc. For instance, a customer score can be calculated using a predetermined scale (e.g. 0 to 100). In addition, the data analytics component 106 can analyze data regarding the competitive market, and can generate market data based on the data regarding the competitive market. Furthermore, the data analytics component 106 can update the customer score and/or market data at a scheduled time interval (e.g. daily, weekly, monthly, yearly, etc.), or as a function of changes to the customer data or the market data. For instance, the data analytics component 106 can update a customer score on a daily basis to reflect changes in the customer's customer data. Additionally or alternatively, the data analytics component 106 can update the customer score or market data as a result of changes to the data, such as a customer opening an additional account or a shift in the competitive market.

The user interface component 108 can expose one or more interfaces enabling user interaction with the rate exception component 102, the data store 104, and/or the data analytics component 106. For instance, the user interface component 108 can provide an interface that allows a user to request a rate exception for a customer. The user can enter a customer identification (e.g. account number, social security number, identification number, etc.), wherein the customer identification will be used by the rate exception component 102 to query the data store for the customer's customer data, and the relevant market data. The user interface component 108 can obtain user input via a set of inputs 110. The inputs 110 can include explicit user inputs (e.g., configuration selections, question/answer) such as from touch screen selections, keyboard, mouse, speech, scanner and so forth. In addition, the user interface component 108 can provide one or more interfaces that display a proposed rate exception determined by the rate exception component 102, and enables users to enter a disposition (e.g. accept, decline, or hold) regarding the proposed rate exception. For instance, the customer may have requested an interest rate above the financial institution's board rate of 4.25% for money market accounts. The user can request a rate exception for the customer via the user interface component 108, and the rate exception component 102 can return rate exception interest rates of 4.60%, 4.65%, and 4.75% for the customer based on their customer data and the relevant market data. The user can review the proposed interest rates via the interface component 108, and enter the customer's disposition regarding the proposed interest rates.

The user interface component 108 may be a form on a web site wherein users access the form via a web browser on a personal computer, mobile device, and so forth. It is also to be appreciated that the user interface component 108 may be a standalone application, applet or widget executing on a personal computer or mobile device. For example, users may input data via an applet on a cellular telephone. The applet communicates the data to the rate exception component 102 via a network (e.g. wireless network, local area network, the Internet, etc.).

The rate exception component 102 can update the customer data with the customer's disposition. For instance, if the customer accepts one of the proposed interest rates, then the rate exception component 102 can apply the interest rate toward the desired account(s). Alternatively, if the customer declines the proposed rates, then the customer data can be updated with the proposed rates and non-acceptance. Updating the customer data to reflect the customer's disposition of a proposed rate exception can prevent inconsistent rate offers, and rate shopping by the customer. For instance, if a customer is unsatisfied with a proposed rate they received at a branch, the customer might call a customer service representative for the financial institution. However, the customer's customer data now reflects the rate(s) proposed by the branch, and therefore prevents the customer service representative from offering a different (e.g. more favorable) rate. Furthermore, if the customer decided to hold the proposed rate for further consideration, the customer can later accept or decline the proposed rate by speaking to a qualified financial institution employee.

Figure 2:
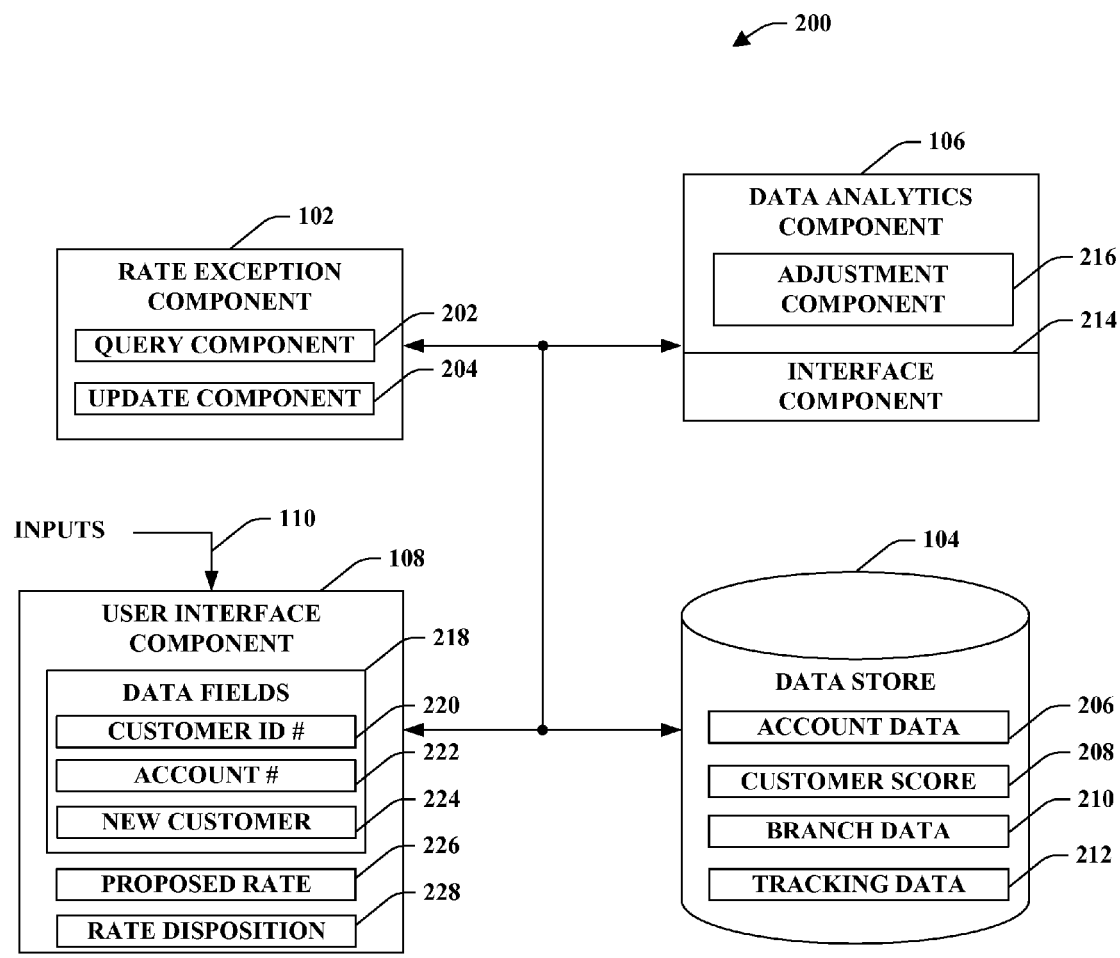
FIG. 2 illustrates a general component block diagram for a rate exception management system in accordance with an aspect of the subject specification.

FIG. 2, an example block diagram of a rate exception system 200 is shown in accordance with an aspect of the subject innovation. The system 200 includes a rate exception component 102 having a query component 202, and an update component 204. As discussed supra, the rate exception component 102 determines one or more proposed rate exceptions for financial products (e.g. deposit account, credit account, investment account, etc.), wherein a rate exception is an interest rate other than a board rate (e.g. standard rate) offered by the financial institution. The rate exception component 102 can determine the rate exceptions based on customer data, such as a customer's relationship with a financial institution, an initial deposit amount, and/or a customer's credit rating. In addition, the rate exception component 102 can determine the rate exceptions based on market data, such as similar products in the competitive environment, and a set of business objectives for the financial institution.

The query component 202 can query the data store 106 to obtain account data 206, one or more customer scores 208, and/or a set of branch data 210. The account data 206 can include customer data, such as account types (e.g. consumer, business, money market, deposit, investment, etc.), contact information, length of patronage, value of accounts, fees issued (e.g. late fees, overdraft fees, etc.), prior rate exception request, and so forth (e.g. data reflecting a customer's relationship with a financial institution). As noted previously, the customer scores 208 can be confidence ratings assigned to customers based on their specific customer data, such as account data 206. The branch data 210 can include market data relevant to a particular branch or location of the financial institution. For instance, the branch data 210 can contain data regarding financial products in the competitive market for the particular branch where a rate exception request is made.

The competitive market for a branch or location of a financial institution can be a street, a city, a state, a region, a country, an economy, etc. The type of competitive market for investment products may differ drastically based on the location of the branch. As an example, the competitive market for the Wall Street branch of a financial institution may be restricted to Wall Street, whereas the competitive market for the South Dakota branch of a financial institution could be the entire Dakota region. In addition, the branch data 210 can contain business objectives of the branch, such as desire to retain current customers or attract new customers. For instance, if a branch of the financial institution desires to attract new customers this can be reflected in the branch data, and used by the rate exception component 102 in determining the permissible rate exceptions.

The update component 204 can update the account data 206, the customer scores 208, the branch data 210, and a set of tracking data 212 with a customer's disposition regarding a proposed rate exception. For instance, when a customer accepts a proposed interest rate for a money market account, the update component 204 can apply the proposed rate to the customer's money market account. Alternatively, if the customer declines the proposed interest rate, then the customer's account data 206 and the tracking data 212 can be updated with the proposed rate and the non-acceptance. As noted previously, updating the account data 206 to reflect the customer's disposition of a proposed rate exception can prevent inconsistent rate offers, and rate shopping by the customer. In addition, updating the tracking data 212 can enable data tracking regarding rate exception dispositions offered by a financial institution, a branch, a set of branches, and so forth. Moreover, the updated tracking data 212 can be used by the data analytics component 104 to determine the branch data 210 (discussed infra).

The data analytics component 106 can determine the customer scores 208 and/or the branch data 210. The data analytics component 106 can determine the customer scores 208 mostly based on the account data 206. For instance, the data analytics component 106 can determine a customer score 208 based on the customer's account types, length of patronage, value of accounts, fees issued (e.g. late fees, overdraft fees, etc.), prior rate exception request, and so forth. Additionally, the data analytics component 106 can determine the branch data based on market data regarding the competitive environment.

The data analytics component 106 includes an interface component 214 that includes most any suitable and/or necessary adapters, connectors, channels, communication paths, etc. to integrate the data analytics component 106 into virtually most any operating and/or database system(s). Moreover, the interface component 214 can provide various adapters, connectors, channels, communication paths, etc., that provide for interaction with the data analytics component 106. The interface component 214 enables the data analytics component 106 to obtain market data from most any of a plurality of external sources (e.g. applications, websites, databases, etc.). For instance, the data analytics component 106 can obtain market data from an Internet source (e.g. website), or a database maintained by the financial institution. Additionally or alternatively, the data analytics component 106 can obtain the market data via explicit user input (discussed supra). The market data can be stored in the data store 104, and included in the tracking data 212.

The data analytics component 106 further includes an adjustment component 216. The adjustment component 216 can update, modify, or otherwise adjust the customer scores 208, and the branch data 210, based on the tracking data 212, including market data obtained by the data analytics component 106. The adjustment component 216 can update the customers scores 208 and branch data 210 at a scheduled interval (e.g. daily, weekly, monthly, etc.). Additionally or alternatively, the adjustment component 216 can update the customer scores 208 and branch data 210 upon the occurrence of an event (e.g. modifications to the account data 206 and/or tracking data 212, etc.).

As noted supra, the user interface component 108 can expose one or more interfaces enabling user interaction with the rate exception component 102, the data store 104, and/or the data analytics component 106. The user interface component 108 includes a set of data fields 218. The data fields 218 can include but are not limited to a customer identification number field 220, an account number field 222, and a new customer field 224. The data fields 104 can be entered, determined, set or otherwise configured via the inputs 110. As noted previously, the inputs can be obtained via most any of plurality of input means, including explicit user inputs (e.g., configuration selections, question/answer) such as from touch screen selections, keyboard, mouse, speech, scanner and so forth. The user interface 108 may be a form on a web site wherein users access the form via a web browser on a personal computer, mobile device, and so forth. It is also to be appreciated that the user interface 108 may be a standalone application, applet or widget executing on a personal computer or mobile device.

In operation, a user (e.g. banker, customer service agent, etc.) can enter one or more data fields 218 to request a rate exception for a customer. The query component 202 can query the data store 106 for account data 206, one or more customer scores 208, and/or branch data 210 relating to the data fields 218. The rate exception component 102 generates one or more permissible rate exceptions based on the account data 206, customer scores 208, and/or branch data 210 (as discussed supra). For example, the proposed rates can be determined using the equation:

$$Rate = F(C, B)$$

where C is the customer score and B is the branch data. The permissible rate exceptions are returned to the user for review via a proposed rate field 226 in the user interface 108. The user interface 108 can expose one or more interfaces to display the proposed rate field 226, which notifies the user of the permissible rate exceptions determined by the rate exception component 102. The user can enter, determine, or otherwise set a customer's disposition (e.g. accept, decline, or hold) regarding the proposed rate exceptions via a rate disposition field 228. The disposition is communicated to the rate exception component 102, which can update the account data 206, customer score 208, branch data 210, and/or tracking data 212 based on the customer's disposition.

Additionally or alternatively, a user can designate a rate request for a new customer via the new customer field 224, and the rate exception component 102 can use a dummy customer identification number 106 to query the data store 104 for the branch data 210. The rate exception component 102 determines a proposed exception rate for new customers as a function of the branch data 120. For example, the proposed exception rate 126 can be determined using the equation:

$$Rate = F(B)$$

where B is the branch data 210. In addition, for new customers the rate exception component 102 can also determine the proposed rates 226 based at least in part on alternative data such as the customer's credit score, account type, or the amount of initial deposit. The proposed rates can be displayed via the user interface 108.

Existing customers with one or more qualifying money market accounts can elect to accept, decline, or hold the proposed rates. Whereas, existing customers without a qualifying money market account can elect to decline or hold the proposed rates. A user will often set-up a qualifying account for the customer before the proposed rate can be accepted. New customers are only given the option to decline the proposed rate. A qualified banker or customer service agent can complete a new customer set-up and set-up at least one qualifying account before new customers can accept or hold the proposed rates.

For instance, if an existing customer wishes to request a rate exception, a financial institution employee (e.g. banker) can enter the customer's customer identification number into the customer identification field 220 and/or one or more of the customer's account numbers via the customer account number field 222. The query component 202 of the rate exception component 102 can query the data store 106 for the customer's account data 206, customer score 208, and/or branch data 210 based on the data fields 218. The rate exception component 102 can determine several permissible rate exceptions based on the account data 206, customer score 208, and/or branch data 210, and return the proposed rates to the user for review via the proposed rate field 226 in the user interface 108. The financial institution employee can discuss the proposed rate exceptions with the customer, and enter the customer's reply via the rate disposition field 228. The rate exception component 102 can acquire the rate disposition, and update the customer's account data 206, customer score 208, branch data 210, and/or a set of tracking data 212. Additionally or alternatively, if a new customer desires to request a rate exception then the user can request the rate exception using the new customer field 224. The rate exception component 102 can base the proposed rate on the branch data 210, and additional new customer data, such as an initial deposit amount, account type, and/or credit score. The rate exception component 102 can update the tracking data 212 and branch data 210 using a new customer identification number or dummy identification number.

Figure 3:
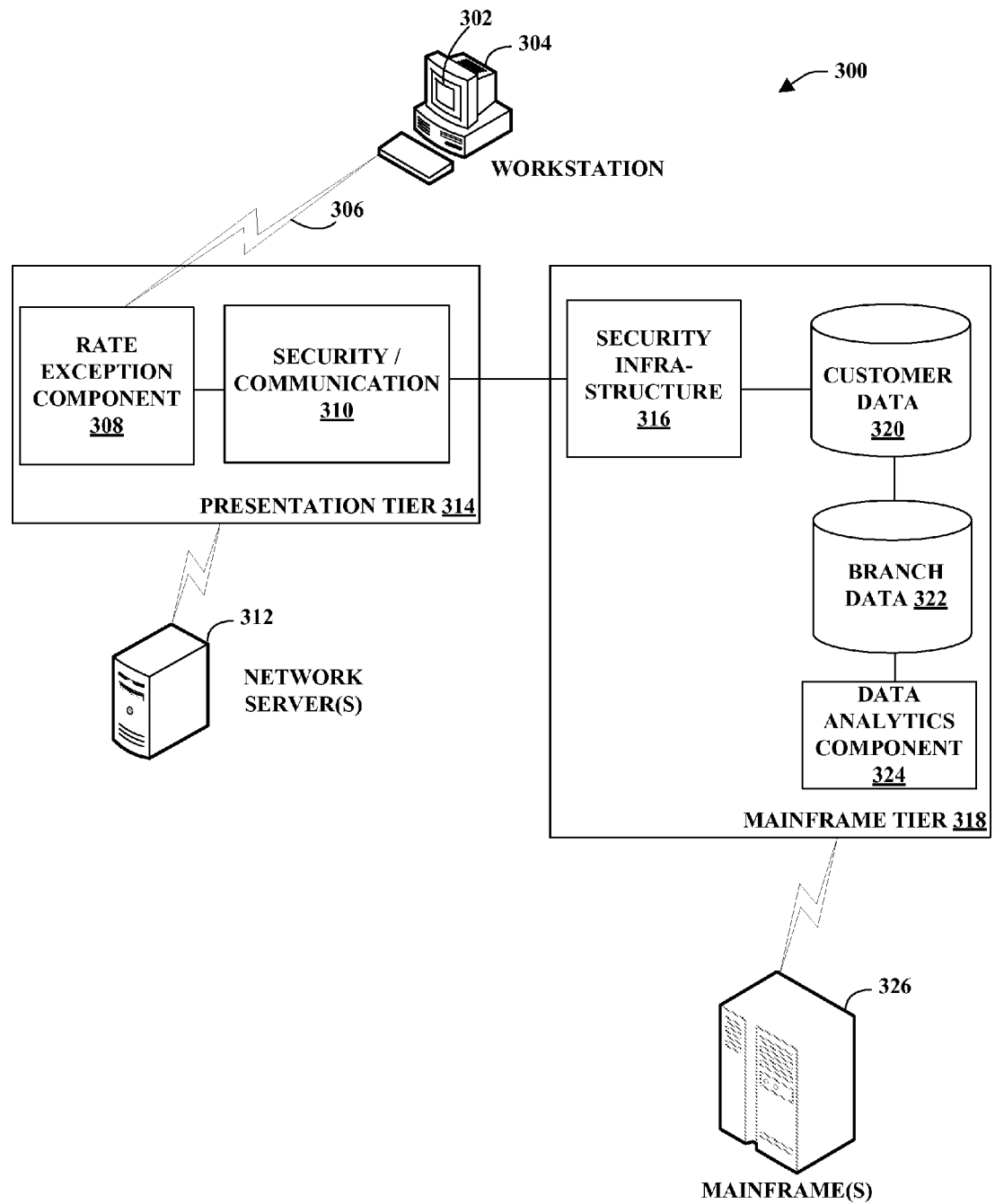
FIG. 3 illustrates a schematic block diagram for a rate exception management system in accordance with an aspect of the subject specification.

FIG. 3 illustrates an example schematic block diagram of a rate exception system 300 in accordance with an aspect of the subject innovation. The system 300 includes a front end user interface 302 executed on a computer workstation 304. Each entity of the rate exception system 300 can be remotely located with communication made across a private and/or public network 306. Administration of the front end user interface 302, a rate exception tool 308, and a security/communication infrastructure 310 are managed by one or more network servers 312 of a presentation tier 314. It is to be understood that this architecture is but one example, and it will be readily apparent to those skilled in the art that a plurality of architectures can be employed within the scope of the subject innovation.

In this example, the presentation tier 314 provides the security/communication infrastructure 310 for receiving customer data from the workstation 304 which is routed through a security infrastructure (e.g., file inspection, firewall etc.) 316 of a main frame tier 318. The customer data submissions are authenticated against a customer data database 320 of the mainframe tier 318. The mainframe tier 318 includes a branch data database 322, and a data analytics component 324. As noted supra, the branch data database 322 maintains data regarding a particular financial institution branch, including but not limited to information on products in the competitive environment (e.g. practices in the region/location, etc.). The data analytics component 324 determines a customer score as a function of the customer's account data maintained in the customer data database 320. In addition, the data analytics component 324 can update the customer score maintained in the customer data database 320. The mainframe tier 318 can be managed by one or more mainframes 326.

In operation, the rate exception tool 308 can query the customer data database 320 for the customer score, and can query the branch data component 322 for rates in the competitive market. The rate exception tool 308 returns one or more allowable rate exceptions to the workstation 304 via the network 306 and the front end user interface 302. A user can determine a rate disposition (e.g. accept, decline, or hold) for the proposed rate, wherein the rate disposition is entered by a banker or customer service agent via the workstation 304. The rate exception tool 308 can update the customer data database 320 with the rate disposition.

User interaction with the rate exception tool 308 and the front end user interface 302 can be accomplished through a sequence of graphical user interfaces (GUI) that would be presented on the workstation 304 (discussed infra).

Figure 4:
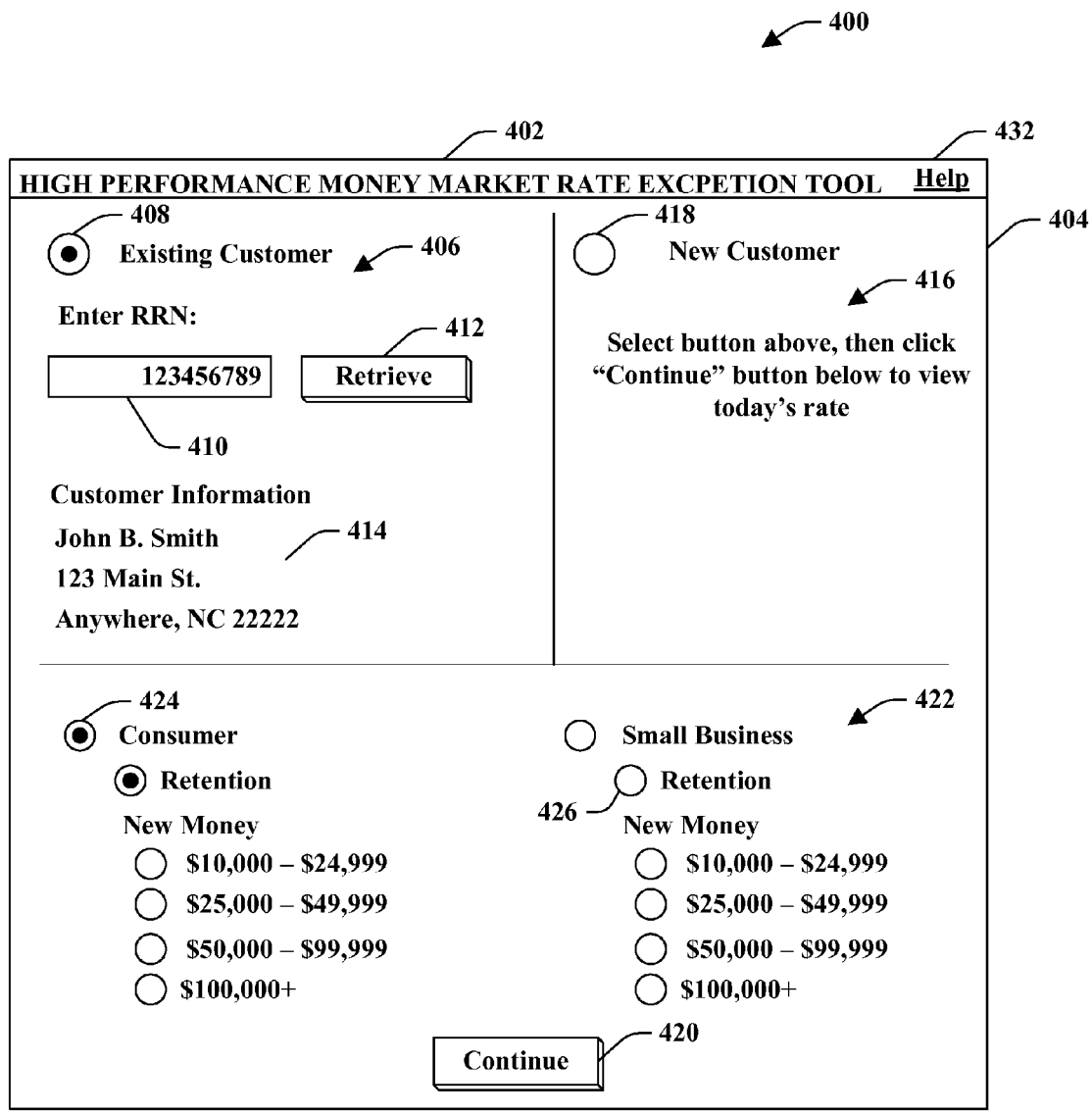
FIG. 4 illustrates a representative graphical user interface in accordance with an aspect of the subject specification.

FIG. 4 illustrates an example graphical user interface (GUI) 400 for a rate exception system in accordance with one or more aspects of the subject innovation. The GUI 400 includes a home view window 402, which is depicted for the user upon logging into the rate exception system. The home view window 402 presents, in an illustrative aspect, a rate exception offered for a given set of customer data. The home view window 402 includes a customer information section 404. The customer information section 404 includes an existing customer subsection 406 having an existing customer selection button 408, a customer identification number field 410, a retrieve button 412, and a customer information display field 414.

In operation, the user can select the existing customer selection button 408, and enter an existing customer's customer identification number in the customer identification number field 410. The rate exception system can verify the customer identification number when the user activates the retrieve button 412. Following verification of the customer identification number 410, the customer's name and address can be displayed in a display field 414. The display field 414 provides for an additional verification of the input data by the user.

The customer information section 404 includes a new customer subsection 416 having a new customer selection button 418. The user can select the new customer selection button 418, and the rate exception system can use a dummy customer identification number (not shown) for data tracking purposes. Additionally, the customer information section 404 includes an account information subsection 422 having account type selection buttons 424 (e.g. consumer or business), and money type selection fields (e.g. retention, new money, and/or deposit amount) 426. In operation, the user can indicate whether the rate exception is requested for a consumer or a business account using the account type selection buttons 424. The user can further indicate whether the rate exception is requested for retention of existing accounts/monies or for new deposit amounts using the money type selection fields 426. As noted supra, the rate exception system 400 queries a customer data database for branch data (not shown) and, if appropriate, a customer score (not shown), subsequent to the user activating the continue button 420. After which the rate exception system 400 can return one or more proposed exception rates (see FIG. 5).

Figure 5:
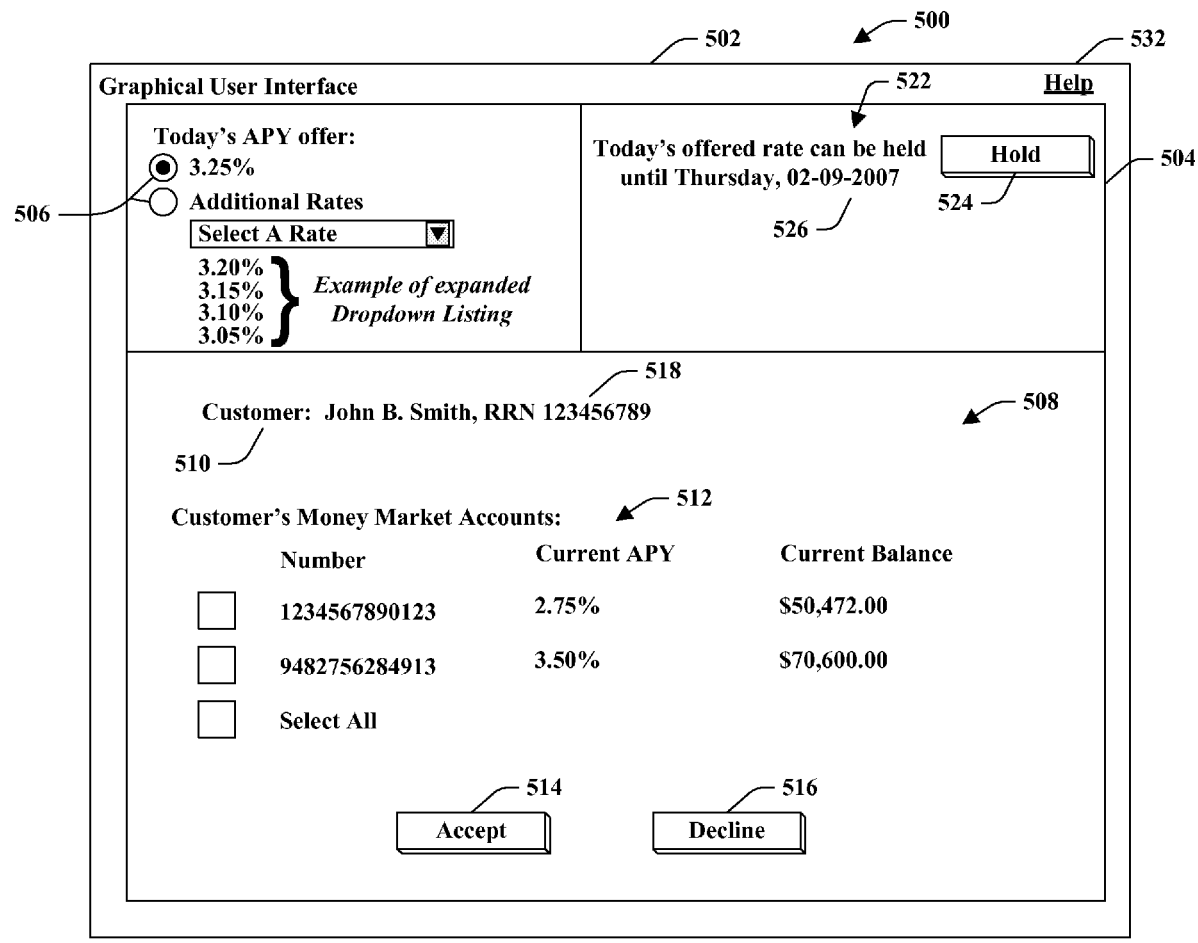
FIG. 5 illustrates a representative graphical user interface in accordance with an aspect of the subject specification.

FIG. 5 illustrates an example graphical user interface (GUI) 500 for a rate exception system in accordance with one or more aspects of the subject specification. Upon entering the customer's required information and requesting a rate exception (see FIG. 4), a rate exception system offer window 502 is depicted for the user, which in an illustrative aspect presents a rate exception offered for a given set of customer data. The offer window 502 includes a rate exception offer section 504 having a proposed rate exception field 506. As noted supra, the rate exception system determines if the customer is eligible for an interest rate above the board rate as a function of the branch data (not shown), customer data (not shown), and if appropriate the customer score (not shown). If the customer is eligible, the calculated interest rate can be displayed in the rate exception field 506. In addition, one or more additional exception rates can be displayed via an additional rates field.

The offer window 502 includes a customer information subsection 508 having a customer information field 510, a set of money market account selection fields 512, an accept button 514, and a decline button 516. The customer information field 510 displays the customer's name and customer identification number 518. The money market account selection field 512 displays each of the customer's qualifying money market account numbers and related information with a corresponding selection box 520. Additionally, the money market account selection field 512 can include a select all field. The money market account selection field 512 enables a user to determine the accounts that the customer's disposition regarding the proposed rate(s) should be applied toward. For example, a customer may decide to apply a proposed rate exception 506 to only one of three qualifying money market accounts. A user can indicate which account the proposed rate should be applied against by activating the corresponding selection box 520 in the selection field 512, and activating the accept button 514. Similarly, the user can also indicate for which accounts the customer would like to decline the proposed exception rate 506 via the decline button 516. As noted supra, only existing customers with qualifying money market accounts can accept the proposed rate exceptions 506.

Moreover, the offer window 502 can include a hold subsection 522 having a hold button 524, and hold date field 526. As noted supra, existing customers may elect to hold the proposed rate exceptions 506 for further consideration; this is accomplished by the user activating the hold button 524. Additionally, the rate exception system determines the maximum length of time (e.g. expiration date) for which the proposed exception rate(s) 506 can be held and displays the expiration date in the hold date field 526.

Figure 6:
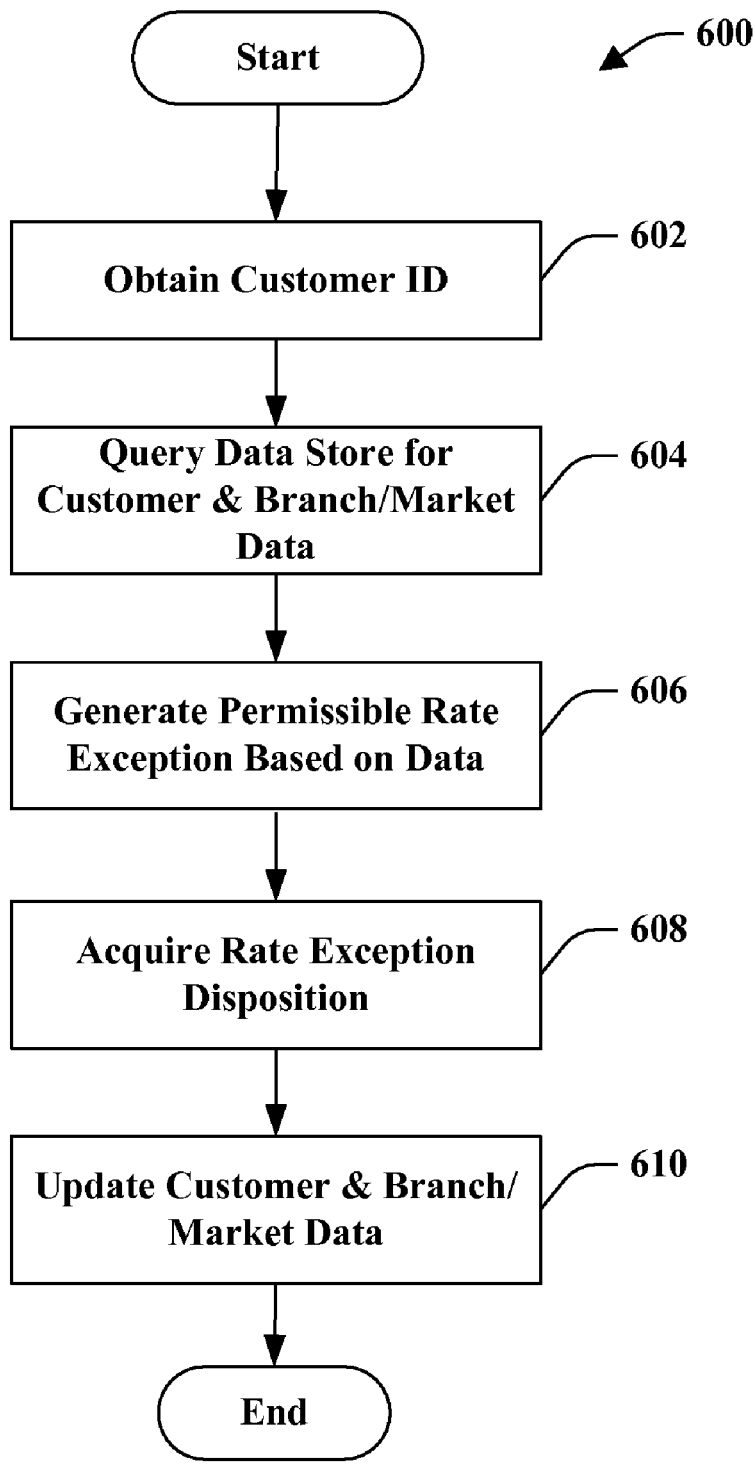
FIG. 6 illustrates an example methodology for providing rate exception determinations in accordance with an aspect of the subject specification.
Figure 7:
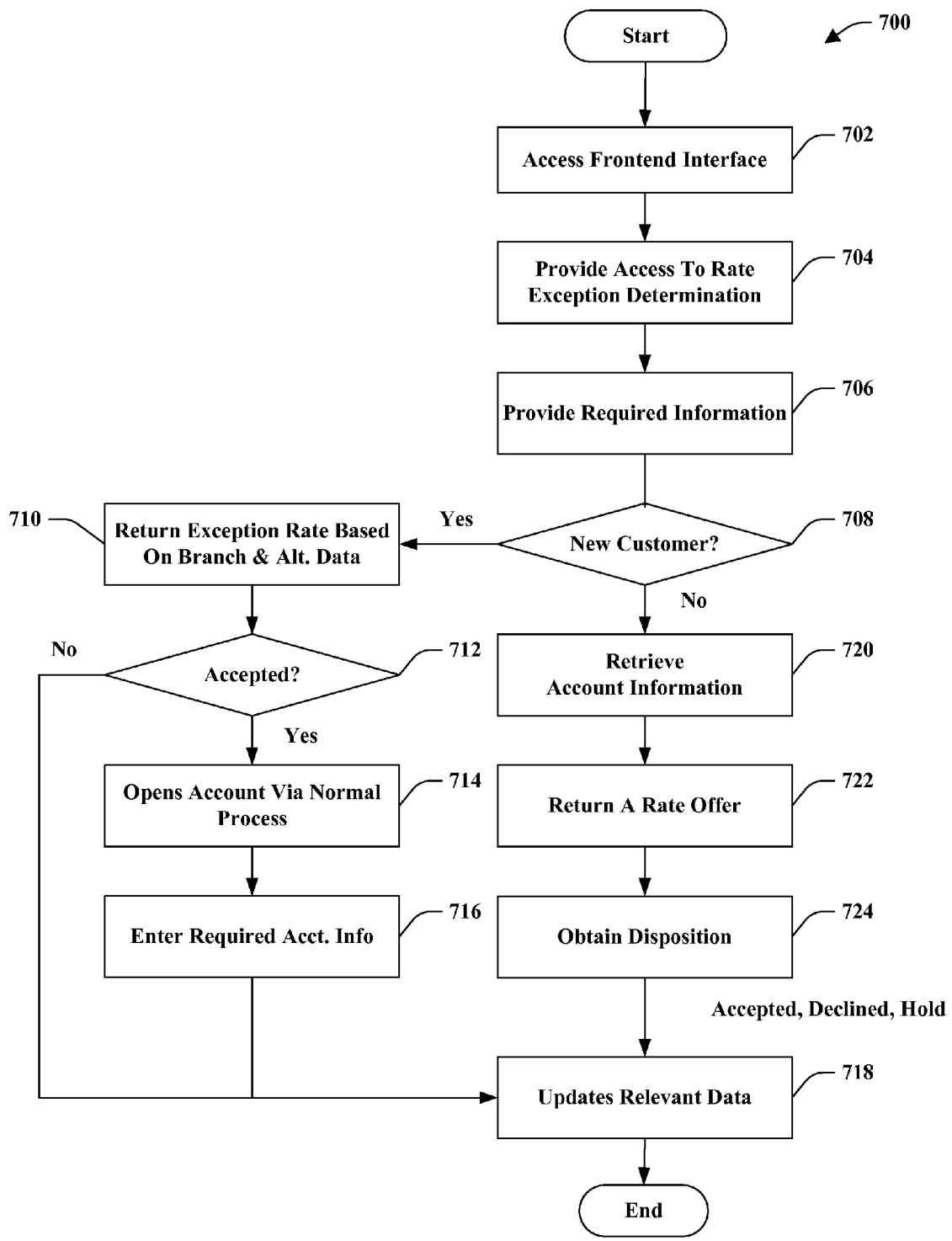
FIG. 7 illustrates an example methodology for providing rate exception determinations in accordance with an aspect of the subject specification.

In view of the example systems described supra, methodologies that may be implemented in accordance with the disclosed subject matter will be better appreciated with reference to the flow charts of FIGS. 6 and 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, the illustrated blocks do not represent all possible steps, and not all illustrated blocks may be required to implement the methodologies described hereinafter.

FIG. 6 illustrates an example method of rate exception determination in accordance with one or more aspects of the subject innovation. At 602, one or more customer identifications are obtained to initiate a rate exception request. For current customers, the customer identification can include but is not limited to a customer identification number, one or more account numbers, a social security number, or other distinguishing characteristics. For new customers, a dummy or tracking identification can be used for record keeping purposes. In addition, alternative data, such as a credit score, account type, or a deposit amount can be acquired.

At 604, the customer identification is used to query a data store, and collect one or more customer data objects and market data relating to the requesting customer. The customer data can include account information and/or a customer score. As discussed previously, the account information can include account types, contact information, length of patronage, value of accounts, fees issued (e.g. late fees, overdraft fees, etc.), prior rate exception request, and so forth (e.g. data reflecting a customer's relationship with a financial institution). The customer scores are confidence ratings assigned to customers based mostly on their account information. Customer data may be unavailable for new customers; the query can return predetermined generic customer data for record keeping, or a user can manually input one or more customer data objects. The market data can include data regarding the competitive market for similar products based on location, such as a street, a city, a state, a region, a country, an economy, and so forth. In addition, the market data can include branch data, which includes but is not limited to business objectives, such as a desire to retain or attract new customers.

At 606, a permissible rate exception is generated based at least in part on the customer data and/or market data. The permissible rate exception can be based on the type of accounts that the requesting customer has or is considering opening with the financial institution (e.g. savings, checking, money market, brokerage, mortgage, etc.), how long the customer has held those accounts, the value of the accounts, how many fees have been issued on those accounts and the reasons for the fees, whether the customer has requested previous rate exceptions, the competitive market for similar products, and the financial institution's business objectives. For instance, if a customer has recently requested a rate exception for their money market accounts, then no permissible rate exception or the board rate may be returned. As another example, if a customer is requesting an interest above the average interest rate for money market accounts in the competitive market, but the customer is a high value customer who has been with the financial institution for a substantial amount of time, then a rate exception can be generated based on the customer data and market data, including the financial institution's business objectives.

At 608, a disposition of the proposed rate exception is obtained. Existing customers with one or more qualifying accounts can elect to accept, decline, or hold the proposed rate. Whereas, existing customers without a qualifying money market account can elect to decline or hold the proposed rate. A user would most often set-up a qualifying account for the customer before the proposed rate can be accepted. New customers are only given the option to decline the proposed rate. A qualified banker or customer service agent would likely complete a new customer set-up and set-up at least one qualifying account before new customers can accept or hold the proposed rate.

At 610, the customer data and/or the market data are updated based on the customer's disposition of the proposed rate exception. For instance, if the customer accepts the proposed rate for one or more qualifying accounts, then the rate can be applied to the customer's account and their account data can be updated to reflect the rate exception request and acceptance. In addition, the branch data can be updated to reflect the disposition of the proposed rate for record keeping purposes, and/or future adjustment of the business objectives.

FIG. 7 illustrates an example methodology 700 for providing consistent and convenient rate exceptions in accordance with an aspect of the subject innovation. At 702, the frontend user interface is accessed. For example, a user (e.g. banker or customer service agent) can access the frontend user interface via a workstation. At 704, access is provided to a rate exception determination. For example, a user can select from among a plurality of banking tools to access a rate exception tool. Accessing the rate exception tool will direct the workstation to a graphical user interface (GUI), as previously discussed. At 706, the information required to obtain a rate exception is provided. For example, using the GUI the user can enter the required information (e.g. account number, customer identification, etc.) to attain a proposed rate exception.

At 708, a determination is made to whether the customer is a new or existing customer. If the customer is a new customer, then a proposed exception rate is returned based on the branch data and alternative data, such as a customer's credit information, proposed account type, and/or proposed deposit amount at 710. At 712, the new customer's disposition (e.g. accept or decline) regarding the proposed rate exception is acquired. If the new customer accepts the offered exception rate, then a new customer set-up and at least one qualifying account are opened via at 714, and at 716, the required account information is obtained. At 718, the relevant data is updated with the customer's disposition (e.g. accept or decline). For example, if the new customer declines the offered exception rates, then a customer data database can be updated with a dummy customer identification number for tracking purposes.

Additionally or alternatively, at 708, if the customer is an existing customer, then a set of account information and a set of branch data are acquired at 720. At 722, one or more proposed exception rates are returned based at least in part on the customer account information and the branch data. At 724, the customer's disposition (e.g. accept, decline, or hold) of the proposed rate exceptions is obtained. At 718, the relevant data is updated with the customer's dispositions. For instance, if the customer accepts the proposed rate exception, then the customer's account information can be updated with the proposed rate.

Figure 8:
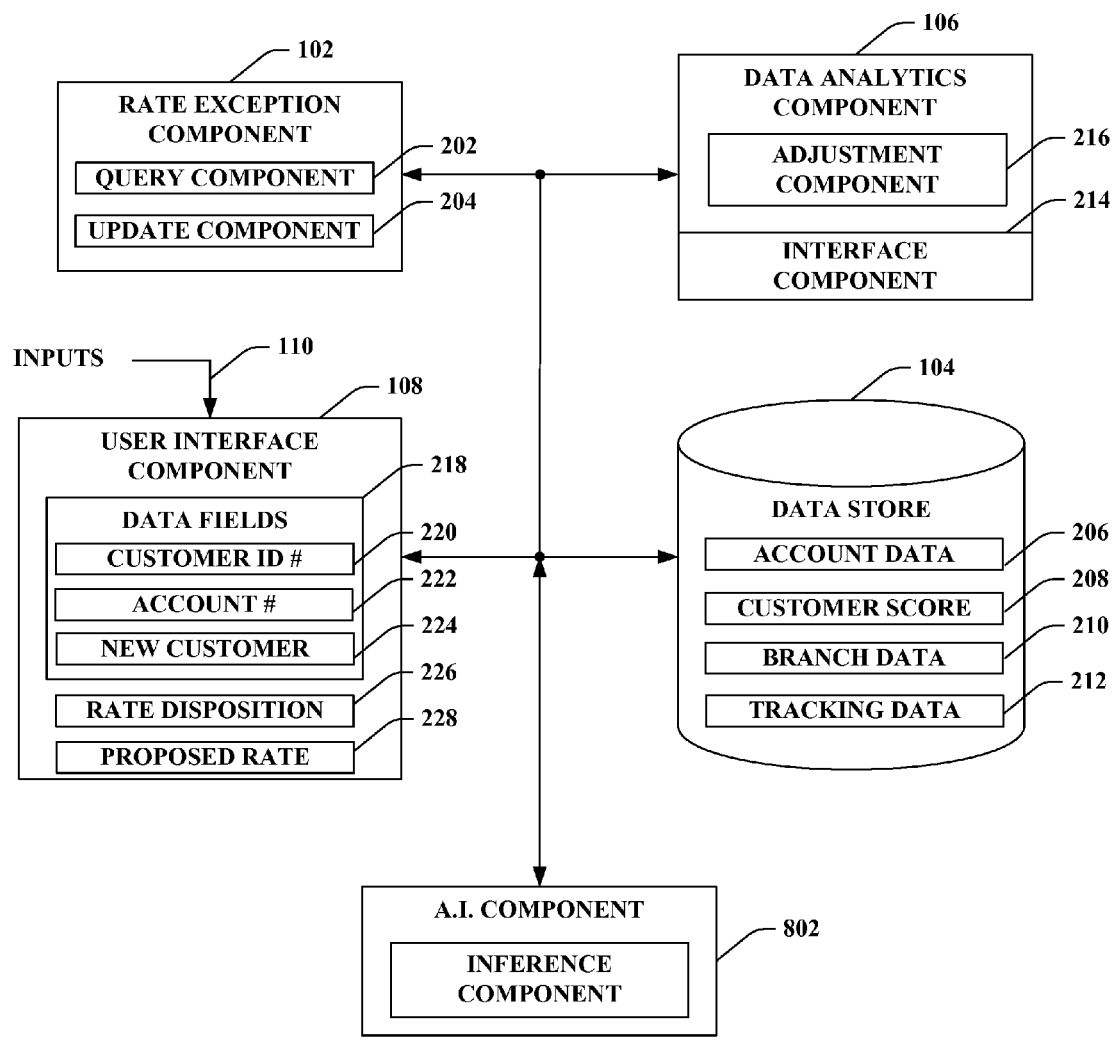
FIG. 8 illustrates a system that employs an artificial intelligence component which facilitates automating one or more features in accordance with the subject specification.

FIG. 8 illustrates a system 800 that employs an artificial intelligence (AI) component 802 which facilitates automating one or more features in accordance with the subject innovation. The subject innovation (e.g., in connection with inferring) can employ various AI-based schemes for carrying out various aspects thereof. For example, a process for adjusting the account data 206, customer score 208, branch data 210, tracking data 212, or inferring a customer's acceptable rate exception can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), at what time of day to implement tighter criteria controls (e.g., in the evening when system performance would be less impacted), and inferring a customer's acceptable rate exception (e.g. offered a rate exception will the customer accept).

Figure 9:
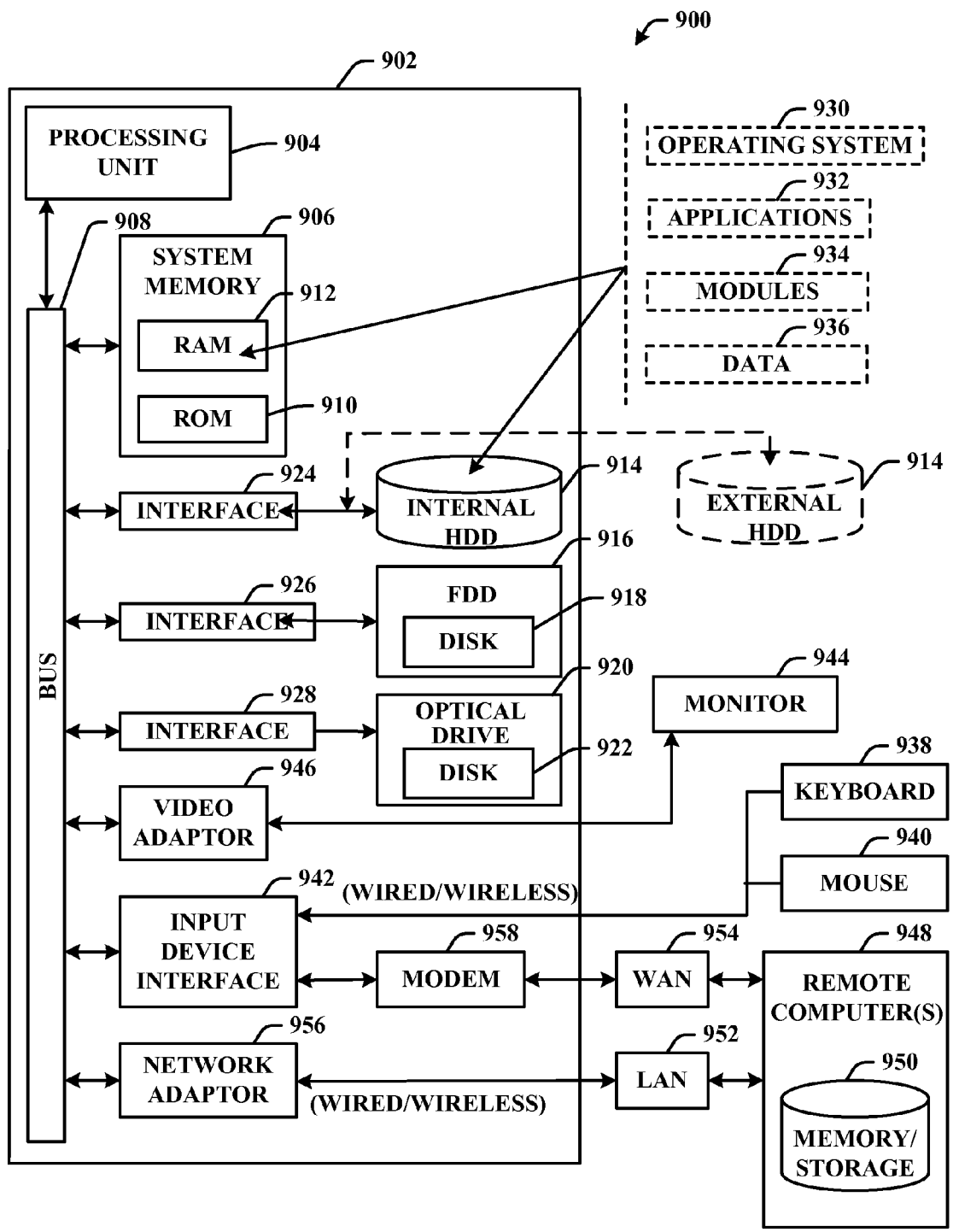
FIG. 9 is a schematic block diagram illustrating a suitable operating environment in accordance with an aspect of the subject specification.
Figure 10:
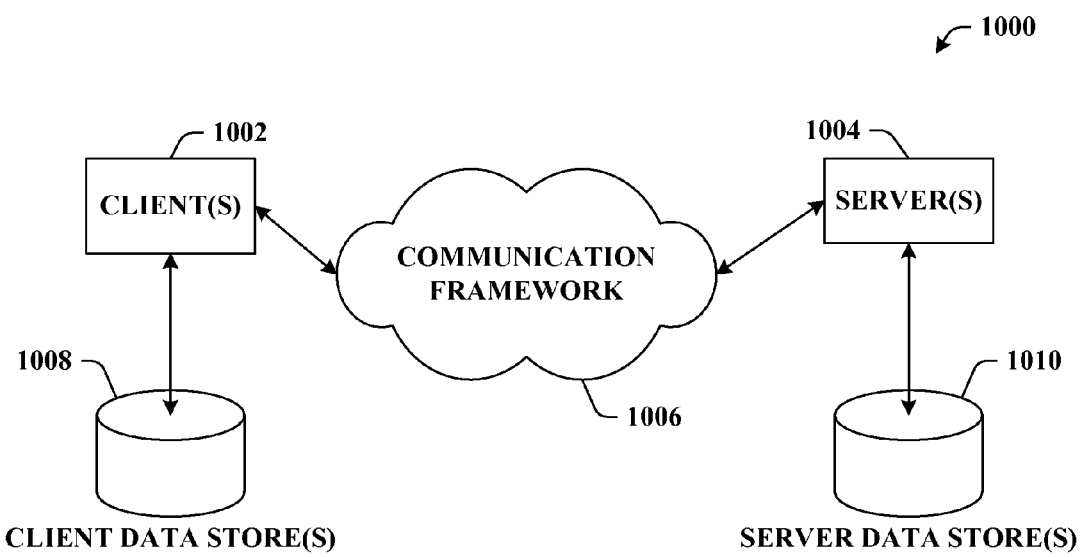
FIG. 10 is a schematic block diagram of a sample-computing environment with which the subject innovation can interact.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an example environment 900 for implementing various aspects of the innovation that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Referring now to FIG. 10, there is illustrated a schematic block diagram of an example computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor coupled to a memory, the processor executing:
a data analytics component that determines at least one of a customer score, or a set of branch data, wherein the data analytics component automatically updates at least one of the customer score or branch data based at least in part on an occurrence of an event, wherein the customer score is a single factor assigned to the customer based at least in part on the customer's relationship with a financial institution, wherein the branch data is based at least in part on market data relevant to a particular branch of the financial institution, and wherein the event comprises a modification to a set of tracking data that tracks rate exception dispositions of prior rate exception offers that were one of denied or placed on hold by the customer; and a rate exception component that determines at least one proposed rate exception for at least one of a deposit account, an investment account, or a credit account based at least in part on at least one of the customer score or the branch data, wherein the proposed rate exception is a different rate than normally offered by the financial institution for the at least one of the deposit account, the investment account, or the credit account.

2. The system of claim 1, the relationship including at least one of the customer's account type, account balance, prior fees assessed, prior rate exception request, or length of patronage.

3. The system of claim 1, the data analytics component determines the customer score based at least in part on the branch data, the branch data is based at least in part on market data including terms associated with similar products in a competitive environment, the competitive environment including at least one of a street, a city, a state, a region, a country, a market, or an economy.

4. The system of claim 1, the rate exception component determines the proposed rate exceptions for new customers based on the branch data and at least one of a customer credit score, account type, or a deposit amount.

5. The system of claim 1, the rate exception component updates at least one of a customer's account data, the customer score, or the branch data, based at least in part on a disposition of the proposed rate exception, the disposition including at least one of an acceptance, a rejection, or a hold.

6. The system of claim 1, wherein the rate exception component comprises a classifier that determines the proposed rate exception based on one or more rate exceptions likely to be acceptable to the customer, wherein the classifier is trained based at least in part on the branch data and customer data associated with a plurality of customers.

7. The system of claim 1, wherein, for the duration of a hold period associated with a prior rate exception offer that was placed on hold, the proposed rate exception determined by the rate exception component is no more favorable to the customer than the prior rate exception offer that was placed on hold.

8. The system of claim 1, further comprising a user interface component that exposes at least one interface facilitating user interaction with the system.

9. The system of claim 8, wherein the user interface component obtains at least one data field from at least one of a user or a data store, at least one of the data fields includes at least one of a customer identification field, an account number field, a new customer field, an account type field, or a deposit amount field.

10. The system of claim 1, the data analytics component stores at least one of the customer score or the branch data in a data store.

11. The system of claim 10, the data analytics component automatically updates, at a predetermined interval, at least one of the customer score or branch data maintained in the data store.

12. A method, comprising:
storing computer executable instructions on a memory;
employing a processor that executes the computer executable instructions stored on the memory to implement the following acts:
analyzing a customer score and a set of branch data, wherein the customer score is a variable assigned to the customer based at least in part on the customer's relationship with a financial institution, wherein the branch data is based at least in part on market data relevant to a particular location of the financial institution and the branch data is updated periodically based at least in part on prior rate exceptions offered to but not accepted by a plurality of customers or potential customers; and generating at least one proposed rate exception for an account type based at least in part on the customer score and the branch data, wherein the proposed rate exception is an exception to a standard rate offered by the financial institution for the account type, and wherein the account type is at least one of a deposit account, an investment account, or a credit account.

13. The method of claim 12, further comprising evaluating the customer's relationship with the financial institution to determine the customer score, wherein the relationship is based at least in part on at least one of account types, account balance, prior fees assessed, prior rate exception request, or length of patronage.

14. The method of claim 12, further comprising analyzing market data including terms associated with similar products in a competitive environment to determine the branch data, wherein the competitive environment including at least one of a street, a city, a state, a region, a country, a market, or an economy.

15. The method of claim 12, further comprising updating at least one of a customer's account data, the customer score, or the branch data based at least in part on a disposition of the proposed exception rate, wherein the disposition includes at least one of an acceptance, a rejection, or a hold.

16. The method of claim 12, further comprising capturing a user input that includes at least one data field, wherein the data fields include at least one of a customer identification field, an account number filed, an account type, a deposit amount, or a new customer field.

17. The method of claim 16, further comprising verifying the data fields by comparing at least one of the data fields and a set of data maintained in a data store, and collecting at least one of the customer score or branch data from the data store if the data fields are verified.

18. The method of claim 12, further comprising storing at least one of the customer score or the branch data in a data store.

19. The method of claim 18, further comprising automatically modifying at least one of the customer scores or branch data maintained in the data store based at least in part on at least one of: changes to the customer score or branch data, or a passage of time.

20. A computer readable medium including instructions stored thereon, comprising:

a first set of instructions for determining at least one of a customer score, or a set of branch data, wherein the customer score is based at least in part on the customer's relationship with a financial institution, the relationship includes at least one of a customer's account types, account balances, prior refunds, or length of patronage, and the branch data is based at least in part on the competitive environment, the competitive environment including at least one of a street, a city, a state, a region, a country, a market, or an economy, and wherein the customer score and the branch data are updated based at least in part on a change to tracking data that monitors prior rate exceptions offered to the customer but placed on hold or denied by the customer;

a second set of instructions for determining at least one proposed rate exception for a money market account based at least in part on at least one of the customer score or the branch data, wherein the proposed rate exception is an interest rate other than a board rate offered by the financial institution for money market accounts, and wherein the proposed rate exception is determined based at least in part on employing a classifier to determine one or more potential rate exceptions the customer is likely to accept, wherein the classifier is trained based at least in part on branch data and customer data associated with a plurality of customers; and a third set of instructions for automatically updating, based on a disposition of the proposed rate exception, the customer score, the branch data, and a set of tracking data that tracks rate exception dispositions, wherein at least one of the first set of instructions or the second set of instructions are executed by at least one processor coupled to a memory.

21. The computer readable medium of claim 20, further comprising a fourth set of instructions for determining the proposed rate exception based on the branch data and at least one of a customer's credit score, an account type, or a deposit amount for a new customer.

* * * * *